(No Model.) 2 Sheets—Sheet 1.
F. W. EICHENAUER.
MACHINE FOR CUTTING MITERS.

No. 496,643. Patented May 2, 1893.

Witnesses
A. J. Schwartz
C. J. Hedrick

Inventor
Frederick William Eichenauer
by Louis Picard & Co
his Attorneys.

THE NORRIS PETERS CO., PHOTO-LITHO., WASHINGTON, D.C.

(No Model.) 2 Sheets—Sheet 2.

F. W. EICHENAUER.
MACHINE FOR CUTTING MITERS.

No. 496,643. Patented May 2, 1893.

Witnesses
A. J. Schwartz
C. J. Hedrick

Inventor
Fredrick William Eichenauer
by Louis Freeard Co
his Attorneys.

UNITED STATES PATENT OFFICE.

FREDRICK WILLIAM EICHENAUER, OF ST. PAUL, MINNESOTA.

MACHINE FOR CUTTING MITERS.

SPECIFICATION forming part of Letters Patent No. 496,643, dated May 2, 1893.

Application filed May 9, 1892. Serial No. 432,308. (No model.)

*To all whom it may concern:*

Be it known that I, FREDRICK WILLIAM EICHENAUER, a citizen of the United States, residing at St. Paul, in the county of Ramsey and State of Minnesota, have invented certain new and useful Improvements in Machines for Cutting Miters; and I do hereby declare the following to be a full, clear, and exact description of the invention, such as will enable others skilled in the art to which it appertains to make and use the same.

This invention relates to machines for cutting miters, at the ends of moldings or rods, for forming miter-joints for frames, paneling and similar purposes.

The object of the present invention is to produce a machine for this purpose which shall be simple and cheap of construction, and which will perform the work in an expeditious and accurate manner.

For this purpose a machine embodying my invention consists essentially in an inverted V-shaped cutter in combination with a support for the moldings, &c., to be mitered and a partition arranged centrally beneath the cutter, which forms a stop for the moldings on each side of the same, as the inclined cutting edges of the cutter penetrate the said molding in the downward passage of the cutter. This V-shaped cutter is preferably operated by a rack and pinion mechanism and mounted in a frame suitably pivoted in the main frame of the machine so that the knife can be set at any suitable angle with respect to the work, a suitable clamping device being provided to hold the knife frame in any position of adjustment.

Sight-holes may be arranged in the side of the machine frame opposite the cutting point, to enable the operator to accurately set the angle of the miter to be cut.

To enable those skilled in the art to which my invention relates, to readily understand the same, I will now describe it with reference to the accompanying drawings, in which—

Figure 1:
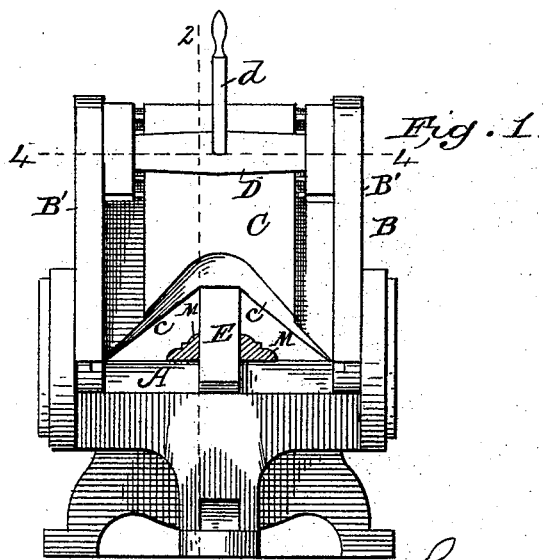
Figure 2:
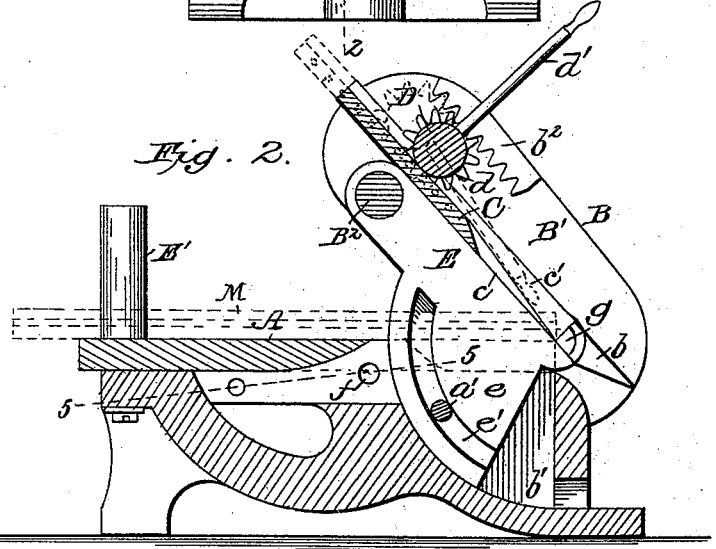
Figures 4, 5:
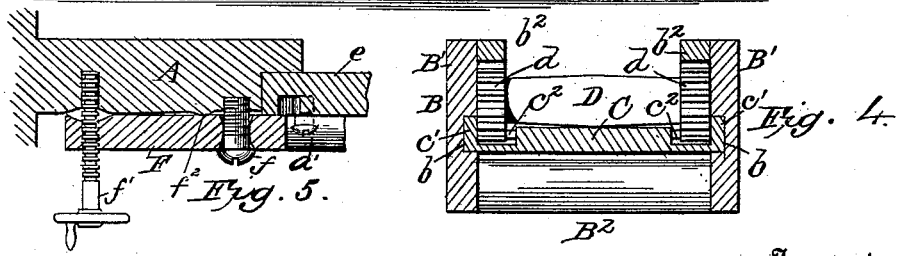
Figure 5:
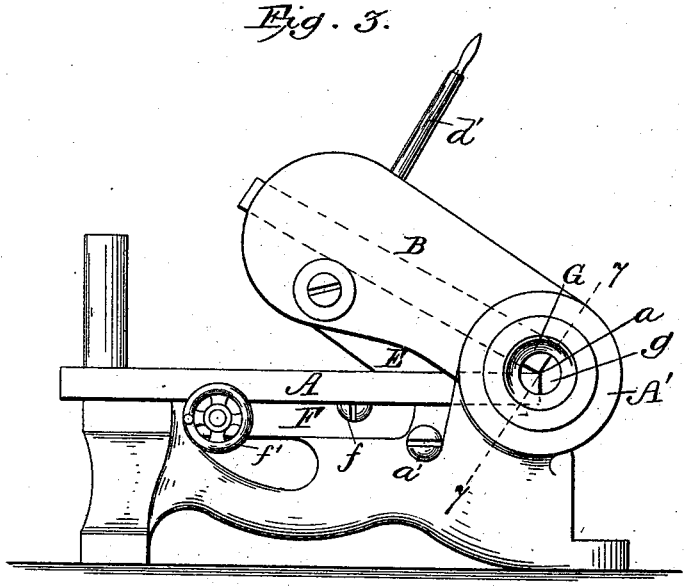
Figure 6:
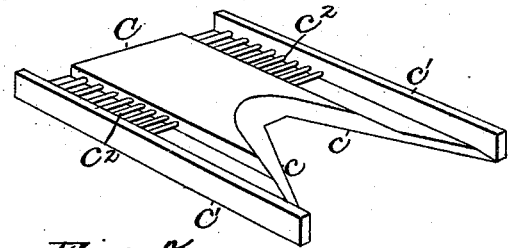

Figure 1 represents a front-elevation of a mitering machine embodying what I consider the preferred way of carrying out my invention; Fig. 2 a vertical longitudinal section thereof on line 2—2, Fig. 1; Fig. 3 a side elevation thereof; Fig. 4 a transverse section on line 4—4, Fig. 1, at right angles to the plane of the cutter; Fig. 5 a sectional detail view taken on line 5—5, Fig. 2, of the clamp for the adjustable cutter-frame; Fig. 6 a detail perspective view of the cutter, and Fig. 7 7 a transverse section on line 7—7, Fig. 3.

In all the views similar letters of reference designate the same parts.

It will be noted that the machine thus shown consists of a bed or table A, upon which the moldings or other work to be mitered rest, and upon which table is arranged at one end a cutter-frame, B, which supports and guides the cutter or knife, C. The cutter-frame it will be observed, comprises the side-walls, B', connected at the rear by a cross-rod, $B^2$, of any suitable form. The inner sides of the side-walls, B', are provided with guide grooves or runways, $b$, in which is guided the knife or cutter, C, whose form is best shown in Figs. 1 and 6, where it will be seen that the same consists of a blade straight in cross-section and having an inverted V-shape cutting edge, $c$, which may be truncated somewhat at the apex, as shown, though this is not material, and which is provided with lateral enlargements at, $c'$, which fit into the guide grooves $b$, as best shown in Fig. 4.

To actuate the cutter, C, I preferably provide the following mechanism, though many other means for the same purpose could be readily devised. I provide the cutter, C, with the racks, $c^2$, $c^2$, and arrange the stationary racks, $b^2$, $b^2$, on the side walls B', of the cutter frame. Between the two sets of racks, I arrange the shaft, D, provided with a pinion, $d$, at each end, so that each pinion meshes with a fixed rack, $b^2$, and a rack, $c^2$, on the cutter, C. A suitable handle, $d'$, is attached to the pinion-shaft, D, for the purpose of turning the same. It will be readily seen that by raising the handle, $d'$, from its depressed position indicated in dotted lines, in Fig. 2, to and beyond the elevated position indicated in full lines in the same figure, the pinions, $d$, travel downwardly, over the racks, $b^2$, and thus urge the cutter downwardly which downward motion is increased by the further action of the pinions $d$, on the racks, $c^2$, on the cutter. The cutter is, moreover, supported by a longitudinal partition, E, forming a part of the cutter-frame, B, and arranged centrally below the cutter, as best shown, in Fig. 1. By referring to that figure it will be noted that this partition passes through the apex of and exactly halves the angle of the V-shaped cutter and that it forms a rest or stop against which the sides of the moldings, M, are urged and held by the inclined cutter-edges, $c$, as they bear down upon them. In conjunction with the table, A, this partition, therefore, serves to hold the moldings so as to insure an accurate cutting operation of the two moldings, so that they will form a perfect miter-joint. At the rear of the table I provide a guide post or stud, E′, which, together with the partition, E, serves to hold the molding in proper position.

The cutter-frame, B, is made adjustable to vary the angle of the cutter, C, with respect to the table, and for this purpose, I prefer to employ the following means: The partition, E, is provided with a downward, sector-shaped extension, $e$, the arc of whose periphery is taken from the forward edge, $a$, of the table as a center. This extension works in a recess $b'$, of corresponding shape in the table-support, and is provided with the concentric groove, $e'$, engaged by a retaining pin, $a'$, extending thereinto from the table-support, (Figs. 2, 3, and 5.) By this arrangement, as will be readily seen, the cutter-frame can be readily tilted into any desired inclination so that the cutter, C, will always pass close to the edge, $a$, of the table, A.

Any suitable clamping device or detent may be employed to hold the cutter-frame in its various positions of adjustment, but I prefer that herein shown (see Fig. 2, 3 and 5), and which consists essentially in a lever, F, secured to the table-support, at $f$, by a screw or bolt, so as to have a slight play. The forward or short arm of this lever bears against the side of the extension, $e$, as shown in Fig. 5, and the rear arm is provided with a hand-screw, $f'$, threaded thereinto and bearing against the table support while at an intermediate point said lever rests against a projection or knob, $f^2$, on the table A, the said knob, $f^2$, serving as a fulcrum for the lever. It will be readily seen that by turning the hand-screw, $f'$, in one direction, the clamp F, will release the extension, $e$, and consequently the cutter-frame, B, and allow its adjustment, while by turning the said screw in the opposite direction the cutter-frame will be clamped in its positions of adjustment.

Figure 7:
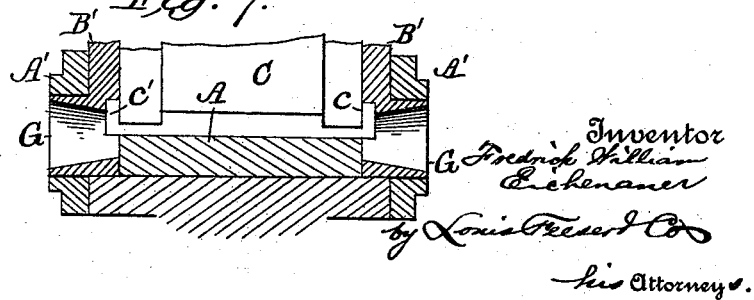

For the purpose of enabling the operator to accurately adjust the angle of the cutters, sight-holes $g$, are provided in upward extensions, A′, of the table support, which sight-holes are preferably formed in the manner indicated in Figs. 3 and 7, where it is seen that the forward ends of the side-walls B′, of the cutter-frame are provided with the lateral hubs, G, in which are formed the conical sight-holes, $g$, opposite the front edge $a$, of the work table, the hubs, G, fitting snugly into the cylindrical holes of the extensions, A′. These hubs, G, it will be seen, moreover, serve the purpose of maintaining the cutter-frame in position, in conjunction with extension, $e$. If desired the interior of the sight-holes, $g$, may be graduated, so that the angle of the miter can be accurately measured.

It is obvious, and has already been stated in the foregoing, that the device shown in explanation of my invention may be variously modified, without departing from the invention. I do not, therefore, desire to be confined to the exact details shown and described, but,

What I claim, and desire to secure by Letters Patent, is—

1. In a mitering-machine, the combination of a work-supporting table, and an inverted V-shaped cutter with a partition arranged centrally below the cutter whereby the inclined edges of the V-shaped cutter are adapted to force the work against the partition, substantially as set forth.

2. In a mitering-machine, a work-supporting table, in combination with a cutter-frame, provided with a central sector-shaped extension, as, $e$, adapted to work in a correspondingly shaped recess in the work-table, substantially as set forth.

3. In a mitering-machine, a work-supporting table, provided with a sector shaped recess in combination with a cutter-frame, having the central sector-shaped extension provided with an arc-shaped groove, and a retaining bolt extending from the table-support into the groove, substantially as set forth.

4. In a mitering-machine, a work supporting table provided with a central sector-shaped recess in combination with a cutter frame having a central extension, as $e$, working in the recess and a clamp mounted on the table support, and adapted to bear against the extension, $e$, to retain the cutter frame in position substantially as set forth.

5. In a mitering-machine, a work table, in combination with a cutter-frame adapted to be tilted into various positions of adjustment and a cutter arranged therein, in a plane with the front edge of the work-table, the cutter-frame being provided at its forward end with extensions having sight-holes opposite the front edge of the table, substantially as set forth.

6. In a mitering-machine, a table-support provided with forward extensions, having cylindrical holes, in combination with an adjustable cutter-frame provided with lateral hubs engaging the said cylindrical holes and provided with central sight-holes, substantially as set forth.

7. In a miter cutting machine, the combination with a work-table having a central recess and a tilting cutter frame provided with a central downward extension engaging the recess in combination with a lever as F, fulcrumed in the table frame, one arm of which bears against the extension while the other arm is provided with a set screw for clamping the lever against the extension, substantially as set forth.

In testimony whereof I have hereunto set my hand in presence of two subscribing witnesses.

FREDRICK WILLIAM EICHENAUER.

Witnesses:
LOUIS FESSER, Jr.,
L. J. WITHER.